2,914,412

COMBINATION POLYGLYCOL AND FATTY ACID DEFOAMER COMPOSITION

John Thomas Stephan, Seattle, Wash.

No Drawing. Application May 21, 1956
Serial No. 585,931

17 Claims. (Cl. 106—78)

The invention relates to an improvement in the control of foam in aqueous alkaline protein, starch, synthetic resin solutions, or combinations thereof, and the like. Particularly this invention is an improvement in the art of defoaming adhesive solutions such as are used in the gluing of wood, the sizing of paper or testiles, the coating of paper, as agricultural spray stickers, and the like by an ethylene glycol insoluble polymeric material which is a homopolymer of an alkylene-oxide other than ethylene-oxide, a heteropolymer of at least two different alkylene-oxides, or a "block" polymer of at least two different alkylene-oxides, in combination with a long chain fatty acid or a water insoluble salt of a polyvalent metal and a long chain fatty acid.

The copolymers of ethylene-oxide with higher alkylene-oxides, and propylene-oxide with butylene-oxide may have a more or less random distribution of the different oxide groupings along the polymer chain or they may be "block" polymers wherein a substantial portion of the polymer chain consists of one kind of alkylene-oxide interspersed with blocks of another kind of alkylene-oxide.

It is well known that alkaline aqueous protein solutions show a marked tendency to foam when agitated or when air or gas is introduced beneath the liquid surface. There are many examples of the use of protein solutions where control of foaming is essential to the success of the operation. The control of foam is particularly important in the coating of paper, the gluing of wood or paper, and the use of protein binders in agricultural sprays. Soybean flour is used in these applications and others because of its cheapness and special properties. The soybean flour of commerce is one which has had the soybean oil extracted from it by solvent extraction. Such extracted soybean flour is particularly prone to foam and a considerable technology has developed in attempting to economically solve this problem. A particularly bad foaming situation is created when a toxic material is added to an alkaline, aqueous protein plywood adhesive to protect said adhesive from microbial decomposition. Toxic materials which give rise to foaming in alkaline aqueous protein adhesives are pentachlorophenol, 2,3,4,6 tetrachlorophenol, 2,4,5 trichlorophenol, o-phenylphenol, 2 chloro-4 phenylphenol, 4 chloro-2 phenylphenol, 6 chloro-2 phenylphenol, o-cresol, p-cresol, mixed isomeric xylenols, and mixtures therof. All of these materials may be used alone or in mixtures to increase the resistance of a protein adhesive to microbial decomposition. Technical grade materials containing more or less by-product impurities of manufacture are frequently used. The toxic phenolic materials may be added either as the free phenolic body or as the water soluble salt obtained by treating the phenolic body with sodium hydroxide, potassium hydroxide, or the like.

I have found that a most effective defoamer is an ethylene glycol insoluble homopolymer of propylene-oxide having an average molecular weight exceeding 598 in combination with a long chain fatty acid or a polyvalent metal salt of a long chain fatty acid. Suitable polyvalent metals are calcium, barium, strontium, magnesium, zinc, cadmium, aluminum, chromium, lead, manganese, iron, nickel or cobalt. Suitable fatty acids are the saturated fatty acids having a molecular weight equal to that of myristic acid or greater. Such acids are myristic, palmitic, stearic, arachidic, behenic acid and the like.

All suitable equivalent polymeric alkylene-oxide materials are ethylene glycol insoluble but they may be either oil soluble or water soluble. By ethylene glycol insoluble I mean incapable of forming a solution containing more than 10% of polymer by weight at 70° F. The polymers of alkylene-oxides vary in consistency from viscous liquids to plastic solids. They are substantially non-volatile. Not all alkylene-oxide polymers have been found to be useful in defoamer compositions. Some of these polymers are water miscible and some are water insoluble. It might be expected that the water insoluble polymers would be effective defoamers and the water soluble polymers not. This is not the case however since some but not all of these polymers may be defoamers. An easy discriminating test to apply is to determine the solubility of the polymer in ethylene glycol at 70° F. A polymer of an alkylene-oxide which is suitable for use as a defoamer when combined with a long chain fatty acid or a polyvalent metal salt of a long chain fatty acid is one which is soluble in ethylene glycol to the extent of not more than 10% by weight at 70° F. Apparently the forces which govern solvation and solubility are related to the forces affecting interfacial adsorption and defoaming action. There seems to be no upper limit to the molecular weight of the useful polyalkylene glycols although in general the higher the molecular weight the more difficult is the preparation. All available samples of ethylene glycol insoluble polypropylene glycols prepared including those of average molecular weight between about 496 and approximately 5000 have been found satisfactory.

Another very useful defoamer is a heteropolymer of ethylene-oxide and propylene-oxide in combination with a long chain fatty acid or a polyvalent salt of a long chain fatty acid. Any proportion of ethylene-oxide to propylene-oxide may be used so long as the resulting polymer is ethylene glycol insoluble and has an average molecular weight of between about 496 and about 5000. Such a polymer may be a random polymer or a block polymer.

Another very useful defoamer is a heteropolymer of ethylene-oxide and iso-butylene-oxide in combination with a long chain fatty acid or a polyvalent salt of a long chain fatty acid. Any proportion of ethylene-oxide to butylene-oxide may be used so long as the resulting polymer is insoluble in ethylene glycol and has an average molecular weight of between about 508 and about 5000. Such a polymer may be a random polymer or a block polymer.

Another very useful defoamer material is a homopolymer of butylene-oxide which is oil soluble and ethylene glycol insoluble and has a molecular weight of between about 600 and about 5000 in combination with a long chain fatty acid or a polyvalent salt of a long chain fatty acid. In general lower molecular weights are more effective the larger the alkyl side chain.

An ethylene glycol insoluble alkylene-oxide polymer which is useful in oil solution as a dust reducing agent for glue powders and as a defoaming agent in combination with a long chain fatty acid or a polyvalent metal salt of a long chain fatty acid for aqueous alkaline protein solutions must be one which is soluble in a predominently aliphatic hydrocarbon solvent such as Shell TS–28 solvent to the extent of at least 1% by weight. In practice the ethylene glycol insoluble alkylene-oxide polymers are extremely effective in combination with long chain fatty acids or with polyvalent metal salts of long chain fatty acids, and small amounts of the order of 0.5 part of defoamer composition per 1000 parts of solution to be defoamed is usually satisfactory. It is not necessary that the polymers of alkylene-oxides have a high degree of solubility in oil. Since the polymers of alkylene-oxides in combination with long chain fatty acids or with polyvalent metal salts of long chain fatty acids are effective defoamers at low concentrations, many commercial defoaming solutions are useful where the concentration of active agents in mixture may be as low as 1% by weight. Usually a 5% solution is most effectively sprayed and gives adequate surface coverages.

Solutions containing a minimum of oil where the oil and blend of polymer and fatty acid or fatty acid salt are present in approximately equal quantity have been used. Because they are so highly effective they may be advantageously diluted with inexpensive hydrocarbons solvents such as General Petroleum Solvent No. 10 obtainable from the General Petroleum Co., Ferndale, Washington, Shell Solvent TS-28 obtainable from the Shell Oil Co., Martinez, California, stove oil, diesel oil, fuel oil, grease, petrolatum, carbon tetrachloride, iso-propanol, and the like.

General Petroleum Solvent No. 10 is a predominantly aromatic hydrocarbon solvent having an initial boiling point of 340° F., a final boiling point of 688° F., a kauri-butanol value of 76, a flash point Penske-Martin closed cup of 210° F., and an A.P.I. gravity of 14.6. Shell Solvent TS-28 is a predominantly aliphatic hydrocarbon solvent having an initial boiling point of 32° F., a final boiling point of 402° F., a kauri-butanol value of 72.5, a flash point Tag open cup of 120° F., and an A.P.I. gravity of 33.6.

These blends of polymeric alkylene-oxides and long chain fatty acids and polyvalent metal salts of a long chain fatty acid may advantageously be dissolved for ease of handling in a solvent having a high solubility for the defoamer materials to give a defoamer concentrate. Such a defoamer concentrate may be shipped to a consumers plant and then cold cut with additional solvent thus saving freight costs. Such additional solvent may be identical with the original solvent or more likely may be a less expensive solvent of the hydrocarbon type.

The defoamer compositions may be used in a number of different ways for example a very convenient method to achieve adequate distribution of the defoamer composition throughout an adhesive dry mixture is to spray the required amount of defoamer material into the dry adhesive powder, while the adhesive powder is agitated in a suitable dry mixer, such as a double action helical ribbon mixer. In somewhat similar fashion the oil solution of defoamer may be sprayed continuously into a soybean flour or an adhesive dry mixture as the flour or mixture moves continuously along a helical conveyor or similar conveyor. Such a method is particularly well adapted to adding defoamer to soybean flour during the flour milling process where the flour is conveyed continuously from point to point.

Another convenient method is to make a substantially dry mixture of the soybean flour containing from 10 to 20% by weight of the defoamer material such that the individual particles of the mixture appear to be thoroughly wetted or coated with the defoamer composition. Such a mixture has a well-oiled appearance and yet does not have so much oil and defoamer present that the oil solution would form an obvious separate liquid phase on standing. Such a mixture may then be dry blended with additional untreated soybean flour or adhesive without lump formation until the desired lower concentration of defoamer is achieved.

In order to compare the relative effectiveness of my various defoamer compositions I have compared them in the disclosed examples in their ability to defoam soybean glue. Other glues such as blood glue, blood and resin glue, casein glue and others would serve equally well for comparative purpose.

The following examples are merely illustrative of certain specific embodiments of the invention and are not to be construed as limiting the scope thereof.

*Example I*

A liquid defoamer composition was made by dissolving together 2.0 grams of a polypropylene glycol having an average molecular weight of 1200 prepared by the polymerization of propylene-oxide, 0.5 gram of calcium myristate, and 36.8 grams of diesel oil. The polypropylene glycol as used dissolved completely in the diesel oil. The surface tension of water against air when the water is saturated with the above defoaming mixture was 34.0 dynes per sq. cm. at 70° F. The polypropylene glycol was further characterized as being a viscous oil which is miscible in all proportions in Shell Solvent TS-28 and in mineral spirits. The polypropylene glycol was only soluble to the extent of 0.1% by weight in ethylene glycol at 70° F. 400 grams of a finely ground extracted soybean flour, specifically the proprietary product termed "Soytex," marketed by the Spencer-Kellogg Company of Decatur, Illinois, and having a protein content of about 44% and a moisture content of about 8–10% were mixed with 1000 grams of 70° F. water and 18 grams of the previously prepared defoamer composition for 3 minutes in a mechanical mixer. The mixture was free of lumps at the end of this period. 40 grams of calcium hydroxide suspended in 230 cc. of water were added to the previous mix and mixed thoroughly with continuous mechanical agitation for 3 minutes. 44 cc. of 50% NaOH solution were added and thoroughly mixed for 1 minute. 100 grams of sodium silicate were added and mixed 1 minute. 20 grams of sodium pentachlorophenate dissolved in 120 cc. of water was added to the mixture and stirred one minute. 6 cc. of a liquid mixture containing 75% carbon bisulfide and 25% carbon tetrachloride by weight were added and mixed 2 minutes. This glue was then removed from the mixer and stored prior to use in the manufacture of plywood. A sample of this glue, 880 grams, was placed in a laboratory foam machine which is designed to test a glue composition as to its foaming tendency or ability. This foam machine consists of a steel roll 8.5″ in diameter and 6.5″ long rotating at 144 r.p.m. in an attached wedge shaped hopper. The total capacity of the hopper was 1200 ccs. The gap or slip where the hopper and the roll almost come in contact is 0.030″ wide. The action of the rotating roll is to drag glue through the slip and around into the upper part of the hopper thus causing the glue in the hopper to entrain air as it rolls in contact with the revolving roll. A normal glue will usually have a specific gravity 70° F., of between 1.00 and 1.5 when freshly mixed. After glue has been subjected to 10 minutes of foaming on the foam machine the specific gravity is measured and the difference in specific gravity between foamed and unfoamed glue is a measure of the foaming tendency of the glue. A more severe test involves subjecting the glue to 20 or 30 minutes of foaming on the foam machine prior to measuring the specific gravity. The glue of Example I had a specific gravity after mixing of 1.06 and after 10 minutes on the foam machine it had a specific gravity of 1.03, after 20 minutes a specific gravity of 0.99, and after 30 minutes on the foam machine it had a specific gravity of 0.92. A soybean glue mixed exactly as before with the exception that no defoamer was used will show a specific gravity after initial mixing of 0.90 and after 30 minutes on the foam machine of 0.60. This demonstrates the remarkable effectiveness of my defoamer composition in combating foaminess in an alkaline soybean plywood glue.

*Example II*

A liquid defoamer composition was made by dissolving together 2.0 grams of the polypropylene glycol of Example I and 36.8 grams of the diesel oil of Example I. This defoamer composition was tested exactly as in Example I using soybean flour from the same lot with the following results: Specific gravity after mixing 1.00, after 10 minutes on the foam machine the specific gravity was 0.95, after 20 minutes on the foam machine the specific gravity was 0.88, and after 30 minutes on the foam machine the specific gravity was 0.79. Since the defoamer composition of Example II was identical with that of Example I except that no fatty acid salt was present, the difference in results are attributed to the effect of the fatty acid salt.

*Example III*

A series of liquid defoamer compositions were made by dissolving together 2.0 grams of the polypropylene glycol of Example I, 36.8 grams of the diesel oil of Example I and 0.5 gram each of one of the following: calcium butyrate, magnesium laurate, iron palmitate, chromium palmitate, calcium stearate, magnesium stearate, aluminum stearate, zinc stearate, sodium stearate, aluminum arachidate, strontium behenate, lauric acid, myristic acid, stearic acid, and behenic acid.

The defoamer compositions were tested exactly as in Example I using soybean flour from the same lot with the following results:

| Salt | Before Test | After 30' on foam machine |
|---|---|---|
| Calcium Butyrate | 1.01 | 0.80 |
| Magnesium Laurate | 1.05 | 0.90 |
| Iron Palmitate | 1.06 | 0.91 |
| Chromium Palmitate | 1.06 | 0.90 |
| Calcium Stearate | 1.07 | 0.93 |
| Magnesium Stearate | 1.07 | 0.95 |
| Aluminum Stearate | 1.06 | 0.92 |
| Zinc Stearate | 1.06 | 0.92 |
| Sodium Stearate | 1.01 | 0.82 |
| Aluminum Arachidate | 1.07 | 0.93 |
| Strontium Behenate | 1.08 | 0.95 |
| Lauric Acid | 1.04 | 0.85 |
| Myristic Acid | 1.06 | 0.91 |
| Stearic Acid | 1.07 | 0.92 |
| Behenic Acid | 1.07 | 0.94 |

These results indicate that calcium butyrate, sodium stearate, and lauric acid are not satisfactory in their defoaming action when combined with a polypropylene glycol. It has been found that glue mixes which show a specific gravity of 0.85 or less after testing for 30 minutes on the foam machine will give rise to serious trouble in foaming when in use in the plywood mill.

*Example IV*

A liquid defoamer composition was made by dissolving together 10 grams of a polypropylene glycol made by the polymerization of propylene-oxide and having an average molecular weight of 5000, 36.8 grams of kerosene, and 5 grams of magnesium laurate. The polyglycol was miscible with Shell Solvent TS-28 and was soluble in ethylene glycol to the extent of 0.08% by weight. This defoamer composition was tested exactly as in Example I using the same soybean flour from the same lot with the following results: Specific gravity after mixing 1.07, after 30 minutes on the foam machine the specific gravity was 0.95. This demonstrates the effectiveness of a defoamer composition containing a higher amount of a fatty acid salt than in previous examples.

*Example V*

A liquid defoamer composition was made by dissolving together 5 grams of a block copolymer of ethylene-oxide and propylene-oxide containing 20% ethylene-oxide and having an average molecular weight of 1500, 36.8 grams of General Petroleum Solvent #10 and 6 grams of aluminum arachidate. This polyglycol was completely miscible in water at 70° F., however it was soluble in ethylene glycol only to the extent of 5% by weight at 70° F. This defoamer composition was tested exactly as in Example I using the same soybean flour from the same lot with the following results; the specific gravity after mixing was 1.08. After 30 minutes on the foam machine the specific gravity was 0.97.

*Example VI*

A liquid defoamer composition was made by dissolving together 5 grams of an iso-butylene-oxide polymer having an average molecular weight of 600, 36.8 grams of Shell Solvent TS-28 and 5 grams of behenic acid. This polyglycol was water insoluble and was only soluble in ethylene glycol at 70° F. to the extent of 0.05% by weight in ethylene glycol at 70° F. This defoamer composition was tested exactly as in Example I except that another commercially available finely ground extracted soybean flour was employed, specifically the proprietary product termed Prosoy L, marketed by the Glidden Company, having a protein content of about 44% and a moisture content of about 8–10%. The following results were obtained. Specific gravity after mixing 1.07. After 30 minutes on the foam machine the specific gravity was 0.97.

*Example VII*

A defoamer composition was made by dissolving together 2 grams of the polyglycol of Example II and 36.8 grams of the grease having a heavy lube oil base and containing 7.8% calcium stearate, specifically the proprietary product termed Unedo "O," marketed by the Shell Oil Company. This defoamer composition had the plastic consistency of a heavy grease, practically identical with the consistency of the original grease. In the defoamer composition as mixed there were 2.87 grams of calcium stearate. This defoamer composition was tested exactly as in Example I and the following results were obtained. Specific gravity after mixing 1.08. After 30 minutes on the foam machine the specific gravity was 0.98.

In many applications where my defoamer compositions are useful the colloidal adhesive solution is spread by means of a rubber roll glue spreader. The common defoamers such as steam distilled pine oil, alpha terpineol, or tri-butyl-phosphate heretofore used are notoriously bad in swelling rubber. In the plywood industry, for example, glue spreaders now practically all use polychloroprene rubber to try and overcome this problem of the swelling of the rolls. Unfortunately polychloroprene rubber is still swollen by common defoamer materials such as pine oil and the like. Of particular interest is the fact that the combination of a polyalkylene glycol and a long chain fatty acid or a polyvalent salt of a long chain fatty acid does not swell polychloroprene rubber and defoamers compounded from such mixtures in general show less swelling of glue spreader rolls than the solvents used. This is an important advantage since once a set of rubber covered rolls is swollen the only remedy is to strip off the swollen rubber and replace with new rubber. This is an expensive operation costing in the neighborhood of $300 for a pair of rolls 10" in diameter and 6 feet long such as are standard in the Douglas fir plywood industry. It is thus seen that important economic advantage is obtained by using my defoamer compositions.

One advantage of my invention is that the solutions of polyalkylene glycols and fatty acids or fatty acid salts in oils are easily sprayed into fine ground adhesive materials such as soybean flour, soluble blood, peanut flour, starch and the like whereby the surfaces of individual adhesive material particles are wetted or oiled sufficiently to greatly reduce dusting of the adhesive materials during bulk handling such as occurs during bagging dry adhesives prior to shipment to the customer and again when used by the customer. There is a definite improvement in the de-dusting effect of the alkylene-oxide polymer and fatty acid or fatty acid salt solutions in oil over oil alone. This is probably due to the ability of the polymer and fatty acid or fatty acid salt mixture to retard the development of static electricity charges on the adhesive material particles. Due to the fact that my defoamer compositions are blends of polymeric alkyleneoxides with fatty acids or fatty acid salts, they are substantially less volatile than commonly used defoamers such as alpha-terpineol or steam distilled pine oil.

Dry adhesive mixes which contain my defoamer compositions do not appreciably change in foaming properties when stored for long periods of time over one year at ordinary temperatures. This is to be contrasted with the behavior of dry adhesive mixes containing steam distilled pine oil as a defoaming agent which mixes deteriorate markedly on dry storage as occurs when bags of dry adhesive mixes are stored in a glue loft prior to use in a plywood mill for example.

In using these polymers and copolymers of alkyleneoxides in combination with a fatty acid having a molecular weight greater than lauric acid, i.e., from the ascending homologous series beginning with myristic acid or a fatty acid salt of a saturated fatty acid having a molecular weight equal to or greater than lauric acid, i.e., from the ascending homologous series beginning with lauric acid, it is to be understood that they may be used singly or in combination one with another and with other defoaming agents.

I claim:

1. A defoamer composition for abatement of foam in aqueous adhesive solution, said composition comprising a physical mixture of a polyglycol and a compound characterized by a saturated fatty acid radical, said polyglycol being soluble in ethylene glycol to the extent of not over 10 parts of polymer to 90 parts of ethylene glycol and being selected from the group consisting of polymers of alkylene-oxides having at least three carbon atoms, hetero polymers of alkylene-oxides, block polymers of alkyleneoxides, and mixtures thereof, and said compound characterized by a saturated fatty acid radical being selected from the group consisting of fatty acids from the ascending homologous series beginning with myristic acid, polyvalent metal salts of saturated fatty acids from the ascending homologous series beginning with lauric acid, and mixtures thereof.

2. A defoamer composition according to claim 1, wherein said polymers of alkylene oxides have a molecular weight ranging from 496 to 5000, said hetero polymers of alkalene oxides having a molecular weight ranging from 508 to 5000, and said block polymers of alkyleneoxides have a molecular weight ranging from 600 to 5000.

3. A defoamer composition according to claim 1, wherein said saturated fatty acid is selected from a group consisting of myristic acid, palmitic acid, stearic acid, arachidic acid, behenic acid, and mixtures thereof.

4. A defoamer composition according to claim 1, wherein the cation of the polyvalent metal saturated fatty acid salt is selected from the group of polyvalent metals consisting of calcium, barium, strontium, magnesium, zinc, cadmium, aluminum, chromium, lead, manganese, iron, nickel and cobalt, and the saturated fatty acid radical of said salt is selected from the group consisting of laurate, myristate, palmitate, stearate, arachidate and behenate radicals.

5. A defoamer composition for abatement of foam in aqueous adhesive solution, said composition comprising a physical mixture of a polyglycol and a compound characterized by a saturated fatty acid radical, said polyglycol being soluble in ethylene glycol to the extent of not over 10 parts of polymer to 90 parts of ethylene glycol and being selected from the group consisting of polymers of alkylene-oxides having at least three carbon atoms, hetero polymers of alkylene-oxides, block polymers of alkylene-oxides, and mixtures thereof, and said compound characterized by a saturated fatty acid radical being selected from the group consisting of fatty acids from the ascending homologous series beginning with myristic acid, polyvalent metal salts of saturated fatty acids from the ascending homologous series beginning with lauric acid, and mixtures thereof, said defoamer composition being dissolved in a water insoluble, substantially non-volatile organic solvent therefor, serving as a spreader.

6. A defoamer composition according to claim 5, wherein said physical mixture of a polyglycol and a compound characterized by a saturated fatty acid radical is present in an amount of about 0.5 part per 1000 parts of solvent.

7. An aqueous adhesive solution resistant to foaming, having in composition therewith a defoamer composition as defined in claim 5.

8. A non-dusty dry adhesive mix containing the defoamer composition of claim 5, said defoamer composition being present in an amount effective to materially reduce the dusting tendency of the dry adhesive mix and effective to abate foam formation when said dry adhesive mix is mixed in aqueous solution in normal commercial quantities.

9. A non-dusty dry adhesive mix according to claim 8, wherein said mix contains not more than about 5% by weight of the defoamer composition.

10. A process for rendering a dry adhesive mix resistant to dusting when dry and to foaming when wet mixed, comprising spraying the dry adhesive mix with an amount of the defoamer composition of claim 5, effective to minimize dusting of said mix when dry and foaming of said mix when in aqueous solution in normal quantities.

11. A process for rendering a dry adhesive material resistant to dusting when dry and to foaming when wet mixed, said process comprising mixing the adhesive material with an amount of the defoamer composition of claim 5, to substantially wet all of the individual adhesive material particles, and continuing additions of dry adhesive material and mixing of said material and said defoamer composition until said composition is distributed substantially uniformly throughout the mass of the adhesive material.

12. A defoamer composition for abatement of foam in aqueous adhesive solution, said composition consisting essentially of an oil solution having dissolved therein a mixture of a polyglycol and a compound characterized by a saturated fatty acid radical, said polyglycol being soluble in ethylene glycol to the extent of not over 10 parts of polymer to 90 parts of ethylene glycol and being selected from the group consisting of polymers of alkylene-oxides having at least three carbon atoms, hetero polymers of alkylene-oxides, block polymers of alkyleneoxides, and mixtures thereof, and said compound characterized by a saturated fatty acid radical being selected from the group consisting of fatty acids from the ascending homologous series beginning with myristic acid, polyvalent metal salts of saturated fatty acids from the ascending homologous series beginning with lauric acid, and mixtures thereof.

13. A defoamer composition according to claim 12, wherein said oil solution imparts a surface tension of not greater than 34 dynes per sq. cm. to a water solution saturated at 70° F. with said oil solution.

14. A defoamer composition according to claim 12, wherein said polymers of alkylene oxides having at least three carbon atoms have a molecular weight ranging from 496 to 5000, said hetero polymers of alkylene oxides have a molecular weight ranging from 508 to 5000, and said block polymers of alkylene-oxides have a molecular weight ranging from 600 to 5000.

15. A defoamer composition according to claim 12, wherein said polyglycol has a molecular weight greater than 200 and is selected from the group consisting of polymers of propylene oxide, polymers of butylene oxides, co-polymers of ethylene oxide and propylene oxide, co-polymers of ethylene oxide and butylene oxide, and co-polymers of propylene oxide and butylene oxide.

16. A defoamer composition according to claim 12, comprising a saturated fatty acid selected from a group consisting of myristic acid, palmitic acid, stearic acid, arachidic acid, behenic acid, and mixtures thereof.

17. A defoamer composition according to claim 12, wherein the cation of said polyvalent metal saturated fatty acid salt is selected from the group of polyvalent metals consisting of calcium, barium, strontium, magnesium, zinc, cadmium, aluminum, chromium, lead, manganese, iron, nickel and cobalt, and the saturated fatty acid radical thereof is selected from the group consisting of laurate, myristate, palmitate, stearate, arachidate and behenate radicals.

References Cited in the file of this patent

UNITED STATES PATENTS

| | | |
|---|---|---|
| 2,346,928 | Lighthipe | Apr. 18, 1944 |
| 2,390,212 | Fritz | Dec. 4, 1945 |
| 2,536,685 | Harman et al. | June 2, 1947 |
| 2,727,009 | Jursich | Dec. 13, 1955 |
| 2,753,309 | Figdor | July 3, 1956 |
| 2,782,162 | Liddell | Feb. 19, 1957 |